United States Patent [19]

Namba et al.

[11] Patent Number: 4,530,325
[45] Date of Patent: Jul. 23, 1985

[54] SUCTION SYSTEM FOR INTERNAL COMBUSTION ENGINE

[75] Inventors: Yuzuru Namba; Kenichi Aoyagi, both of Hamamatsu, Japan

[73] Assignee: Suzuki Jidosha Kogyo Kabushiki Kaisha, Shizuoka, Japan

[21] Appl. No.: 540,101

[22] Filed: Oct. 7, 1983

Related U.S. Application Data

[63] Continuation of Ser. No. 302,230, Sep. 14, 1981, abandoned.

[30] Foreign Application Priority Data

Nov. 13, 1980 [JP] Japan .................. 55-159715

[51] Int. Cl.³ ........................................ F02M 35/10
[52] U.S. Cl. ............................ 123/308; 123/188 M
[58] Field of Search ............. 123/52 MB, 188 M, 308, 123/432

[56] References Cited

U.S. PATENT DOCUMENTS 4,132,197  1/1979  Hanawa et al. ............... 123/308
4,271,802  6/1981  Hori et al. ................... 123/432

FOREIGN PATENT DOCUMENTS 0008407  1/1978  Japan .................. 123/308
0017822  2/1978  Japan .................. 123/432
0013807  2/1979  Japan .................. 123/432
0103913  8/1979  Japan .................. 123/308

Primary Examiner—Parshotam S. Lall
Assistant Examiner—W. R. Wolfe
Attorney, Agent, or Firm—Quaintance & Murphy

[57] ABSTRACT

A suction system for an internal combustion engine having a sub-suction path for generating a swirl of suction gases in a combustion chamber. The sub-suction path is in addition to the main suction path to be opened or closed by a suction valve. More specifically, in a multicylinder internal combustion engine, path portions for constructing the sub-suction path are formed in a cylinder head, a suction manifold and a carburetor such that the sub-suction path is automatically constituted when the carburetor is connected to the cylinder head through the suction manifold, without further connections being necessary.

9 Claims, 1 Drawing Figure

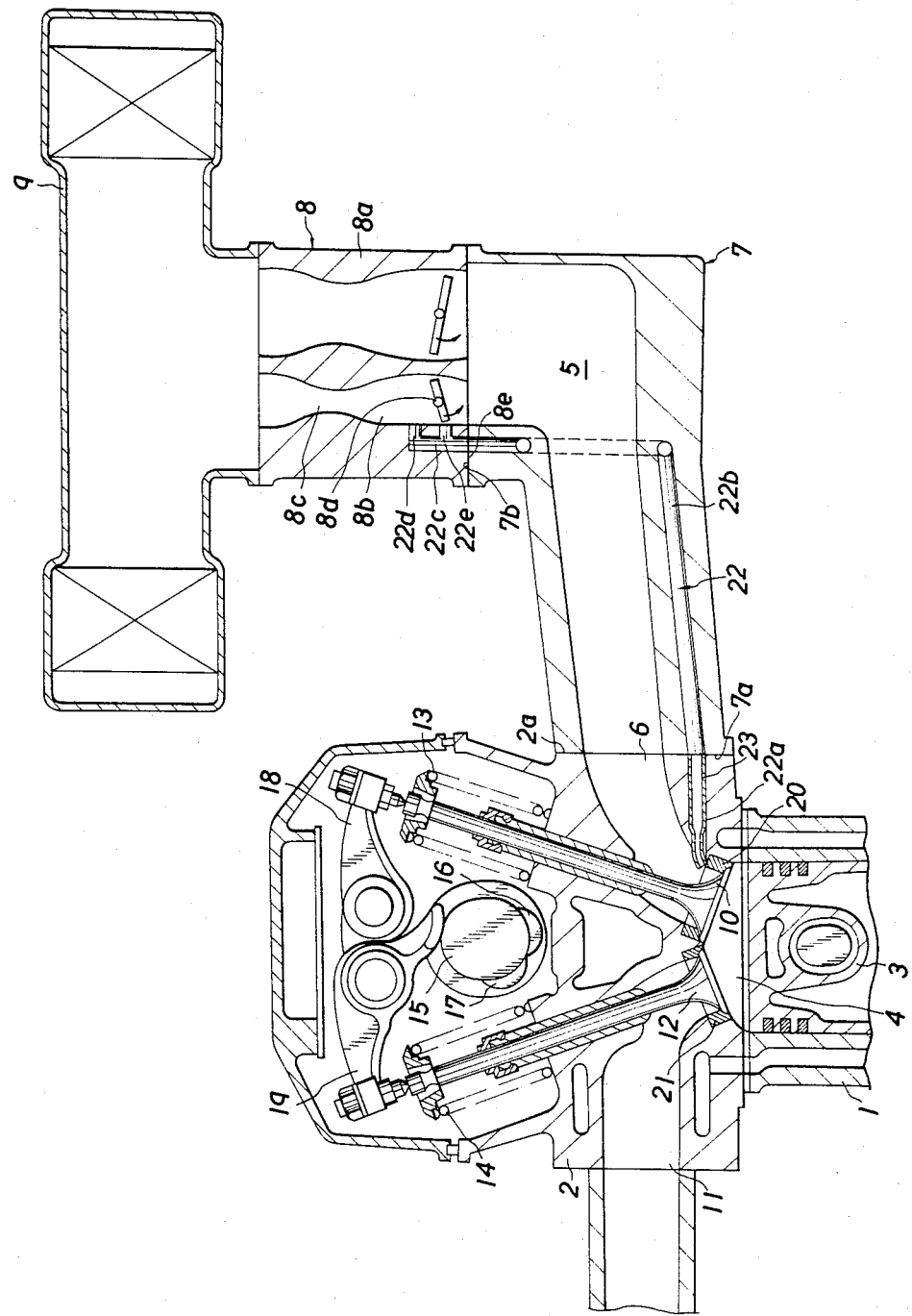

SUCTION SYSTEM FOR INTERNAL COMBUSTION ENGINE

This application is a continuation application of Ser. No. 302,230, filed Sept. 14, 1981, now abandoned.

BACKGROUND OF THE INVENTION

1. Field of the Invention

The present invention relates to a suction system for an internal combustion engine, and more particularly to a suction system of the above type, in which a sub-suction path for generating a swirl of suction gas in a combustion chamber is provided in addition to a main suction path to be opened or closed by a suction valve.

2. Description of the Prior Art

Recently, internal combustion engines for automobiles are required not only to purify the exhaust gas but also to improve the rate of fuel consumption (mileage). For these requirements, exhaust gas recirculation (EGR) and a lean combustion are frequently employed. It is known that in order to prevent the combustion fluctuations and misfiring while satisfying both the requirements for EGR and lean combustion, it is satisfactory to increase the burning velocity.

In order to raise this burning velocity, there have been recently proposed several systems, in which a sub-suction path provided separately from a main suction path is designed to inject a gas into a combustion chamber thereby to generate a swirl of the suction gas in the combustion chamber.

However, the suction system provided with the sub-suction path is still being developed. In fact, since the suction system according to the prior art uses a variety of different conduits to construct the sub-suction path, it becomes remarkably complex. Furthermore, connecting the conduits becomes troublesome.

SUMMARY OF THE INVENTION

It is, therefore, a primary object of the present invention to provide a suction system for an internal combustion engine, in which a sub-suction path is constructed without use of any piping outside the conventionally existing parts.

A secondary object of the present invention is to provide a suction system for an internal combustion engine, in which a sub-suction path is automatically constituted when a carburetor is connected to a cylinder head through a suction manifold.

In order to attain these objects, according to the present invention, the sub-suction path is constituted by a first path portion formed in the cylinder head, a second path portion formed in the suction manifold, and a third path portion formed in the carburetor so that the sub-suction path having its inlet end opened into the flow path of the carburetor and its outlet end opened into the suction port of the cylinder head may be automatically formed when the carburetor is connected to the cylinder head through the suction manifold and so that the sub-suction path is communicated with or cut off from the combustion chamber by means of the suction valve which serves to open or close the main suction path.

BRIEF DESCRIPTION OF THE DRAWING

The accompanying drawing is a schematic view showing one embodiment of the present invention.

DESCRIPTION OF THE PREFERRED EMBODIMENT

In the accompanying drawing there is shown an internal combustion engine of the present invention comprising a cylinder 1, a cylinder head 2 and a piston 3, respectively, which define a combustion chamber 4 into which a main suction path 5 is opened. This main suction path 5 is constructed into a path which leads from a suction port 6 formed in the cylinder head 2, a suction manifold 7, a two-barrel carburetor 8 acting as a fuel supply device to an air cleaner 9.

The outlet end of the suction port 6, i.e., the open end opened into the combustion chamber 4, is equipped with a suction valve 10, by which the suction port 6 is opened or closed. An exhaust port 11 formed in the cylinder head 2 is opened or closed by an exhaust valve 12. The valves 10 and 12 are opened or closed by the action of a control mechanism which is constructed of return springs 13 and 14, cams 16 and 16 driven by a cam shaft 15 and rocker arms 18 and 19 and so on, so that they are seated upon their respective valve seats 20 and 21 when closed.

The internal combustion engine of the present invention has a sub-suction path 22 which has a smaller effective opening area than that of the main suction path 5. The sub-suction path 22 is constructed of: a first path portion 22a formed in the cylinder head 2 and having an injection nozzle pipe 23 pressfitted therein; a second path portion formed in the suction manifold 7; and a third path portion 22c formed in the body 8a of the carburetor 8. The third path portion 22c is bifurcated to form two inlet ends 22d and 22e which are respectively opened into the primary flow path 8b of the carburetor 8. Both the two inlet ends 22d and 22e are spaced in the flow direction of the primary flow path 8b. Specifically, the upstream side inlet end 22d is always opened in the path 8b between the primary venturi portion 8c and the primary throttle valve 8d of the carburetor 8 whereas the downstream side inlet end 22e is opened at such a position as is closed by the primary throttle valve 8d at its closed (i.e., idling) position.

The injection nozzle pipe 23 substantially constructing the outlet end portion of the sub-suction path is designed to have a nozzle portion with a reduced diameter at its tip such that it is opened immediately upstream of the suction valve 10. Moreover, the injection nozzle pipe 23 is directed substantially in the tangential direction of the wall of the cylinder 1 so that a swirl of the suction gases is generated around the axis of said cylinder 1 in the combustion chamber 4. The swirling direction is determined such that the suction gases flow to the exhaust port 11 after it has swept an ignition plug (not shown).

The exhaust gas is recirculated from an exhaust path to either the main suction path 5 or the sub-suction path 22 via an EGR valve (not shown). The constructions of the EGR path and the EGR valve can be made similar to those of the prior art, and are therefore omitted from the drawing.

The first, second and third path portions 22a, 22b and 22c constituting the sub-suction path will be described in more detail. The first path portion 22a is designed to have its one end opened immediately upstream of the suction valve 10, i.e., in the port 6 and in the vicinity of the suction valve 10 and its other end opened in a joint end face 7a to be jointed to the suction manifold 7. The second path portion 22b is designed to have its one end opened in a joint end face 7a to be joined to the cylinder head 2 and its other end opened in a joint end face 7b to be joined to the carburetor 8. The third path portion 22c is designed to have its one end opened in a joint end face 8e to be joined to the suction manifold 7 and its other ends 22d and 22e opened in the flow path 8b of the carburetor 8, as has been described hereinbefore. Thus, communication is established between the first and second path portions 22a and 22b, when the suction manifold 7 is connected to the cylinder head 2. Communication is also established between the second and third path portions 22b and 22c when the suction manifold 7 and the carburetor 8 are connected to each other. By combining the cylinder head 2, the suction manifold 7 and the carburetor 8 in the aforementioned ways, the first, second and third path portions are made to communicate, thus automatically forming the sub-suction path 22.

In a multicylinder engine, the second path portion 22b formed in the suction manifold 7 is divided into branches equal in number to the number of cylinders of the engine, each branch being opened in the joint end face to be joined to the cylinder head 2. On the other hand, the cylinder head 2 is also provided with the first path portions of a number corresponding to the cylinder number and is connected to the suction manifold 7 such that the first path portions are respectively coincident with the open ends of the aforementioned branches of the second path portion 22b formed in the aforementioned suction manifold 7.

In the internal combustion engine of the present invention, during the suction stroke having the suction valve 10 opened, the combustion chamber 4 is supplied with an air-fuel mixture from the main suction path 5, whereas a gas is injected from the sub-suction path 22 into the combustion chamber 4. By the injection of the gas from the sub-suction path 22, the mixture sucked into the combustion chamber 4 is swirled around the axis of the cylinder 1 so that the burning velocity is accelerated.

The number and the open positions of the inlet ends of the sub-suction path are arbitrary so long as the inlet ends of the sub-suction path are opened into the flow path of the carburetor. In fact, in case the sub-suction path is provided with such two inlet ends as are indicated at 22d and 22e and as are opened at the positions according to the embodiment, the gas is introduced, during the idling operation, into the sub-suction path only from the inlet end 22d so that the gas can be injected from the sub-suction path at a relatively low rate matching the mixture supplied to the combustion chamber at a low rate during the idling operation. To the contrary, the gas can be sucked at a high rate into the sub-suction path from both the inlet ends 22d and 22e during a medium load operation in which much EGR is effected so that a stable combustion can be ensured.

What is claimed is:

1. A suction system comprising:
a main suction path constructed of a suction port formed in a cylinder head and adapted to be opened and closed by a suction valve, and a suction manifold connecting said suction port and a carburetor; and
a sub-suction path provided separately from said main suction path and having its outlet end opened immediately upstream of said suction valve and its inlet end opened in a flow path of said carburetor so as to inject a gas into a combustion chamber during the suction stroke thereby to generate a swirl of the suction gas in said combustion chamber,
wherein the improvement resides in that said sub-suction path is constructed of: a first path portion formed in said cylinder head, both ends of the first path portion being opened into said suction port and in the joint end face of said suction manifold, respectively; a second path portion formed in said suction manifold, both ends of the second path portion being opened in the joint end face of said cylinder head and in the joint end face of said carburetor, respectively; and a third path portion formed in said carburetor, both ends of the third path portion being opened in the joint end face of said suction manifold and into the flow path of said carburetor, respectively, so that the communication between said first, second and third path portions is established by combining said cylinder head, said suction manifold and said carburetor;
wherein an injection nozzle pipe is fitted in said first path portion;
wherein the open end portion of said third path portion at the side of said flow path is branched to form two inlet ends, the one of which is always opened into said flow path between a venturi portion and a throttle valve of said carburetor whereas the other of which is opened at such a position that is closed by said throttle valve under the idling operation;
wherein said carburetor is of two-barrel type, and said third passage portion is opened into the primary flow path of said two-barrel carburetor.

2. An internal combustion engine comprising:
A. A carburetor constituting means for mixing fuel with air and adapted to supply the fuel-air mixture to a main suction path wherein said carburetor is also provided with a subsuction path having an area transverse to flow which is smaller than the main suction path; and
B. A suction manifold having a main suction path in fluid communication with the main suction path of the carburetor and having a subsuction path in fluid communication with the subsuction path of the carburetor; and
C. A cylinder head having a main suction path in fluid communication with the main suction path of the manifold and having a sub-suction path in fluid communication with the sub-suction path of the manifold
wherein the sub-suction path is contained completely within the carburetor, the manifold, and the cylinder head;
whereby connection of the carburetor to the manifold and connection of the manifold to the cylinder head causes the various portions of the sub-suction path to be in fluid communication with each other; and
wherein a first portion of the fuel-air mixture flows into a combustion chamber from said main suction path and a second portion of the fuel-air mixture issues from said sub-suction path into said combustion chamber approximately at a right angle to the first portion of the fuel-air mixture, thus imparting a swirling motion to the fuel-air mixture in the combustion chamber.

3. An internal combustion engine comprising:

A. A carburetor consistuting means for mixing fuel with air and adapted to supply the fuel-air mixture to a main suction path wherein said carburetor is also provided with a subsuction path having an area transverse to flow which is smaller than the main suction path; and B. A suction manifold having a main suction path in fluid communication with the main suction path of the carburetor and having a subsuction path in fluid communication with the subsuction path of the carburetor; and C. A cylinder head having a main suction path in fluid communication with the main suction path of the manifold and having a sub-suction path in fluid communication with the sub-suction path of the manifold Wherein the sub-suction path is contained completely within the carburetor, the manifold, and the cylinder head;

whereby connection of the carburetor to the manifold and connection of the manifold to the cylinder head causes the various portions of the sub-suction path to be in fluid communication with each other;

wherein the sub-suction path in the cylinder head is a cylindrical hole containing a nozzle whose outlet is aimed at an upstream side of an intake valve;

whereby opening of the intake valve when there is sub-atmospheric pressure downstream of the intake valve causes a first portion of the fuel-air mixture to flow downstream past the intake valve through the main suction path and causes a second portion of the fuel-air mixture to pass through the sub-suction path and to issue from the nozzle approximately at right angles to the first portion of the fuel-air mixture thusly causing a swirling motion of the fuel-air mixture in a zone just downstream of the intake valve.

4. An internal combustion engine comprising:

A. A carburetor consistuting means for mixing fuel with air and adapted to supply the fuel-air mixture to a main suction path wherein said carburetor is also provided with a subsuction path having an area transverse to flow which is smaller than the main suction path; and B. A suction manifold having a main suction path in fluid communication with the main suction path of the carburetor and having a subsuction path in fluid communication with the subsuction path of the carburetor; and C. A cylinder head having a main suction path in fluid communication with the main suction path of the manifold and having a sub-suction path in fluid communication with the sub-suction path of the manifold wherein the sub-suction path is contained completely within the carburetor, the mainfold, and the cylinder head;

whereby connection of the carburetor to the manifold and connection of the manifold to the cylinder head causes the various portions of the sub-suction path to be in fluid communication with each other;

wherein the sub-suction path in the cylinder head is a cylindrical hole containing a pipe, the outside diameter of which is substantially equal to the inside diameter of the cylindrical hole; a downstream portion of the pipe being necked down to an outside diameter less than the inside diameter of the cylindrical hole; the downstream portion of the pipe being downwardly curved toward a upstream side of an intake valve such that when the intake valve is opened, the open end of the downstream portion of the nozzle points into the zone just downstream of the intake valve;

whereby opening of the intake valve when there is sub-atmospheric pressure downstream of the intake valve causes a first portion of the fuel-air mixture to flow downstream past the intake valve through the main suction path and causes a second portion of the fuel-air mixture to pass through the sub-suction path and to issue from the nozzle approximately at right angles to the first portion of the fuel-air mixture thusly causing a swirling motion of the fuel-air mixture in a zone just downstream of the intake valve.

5. An internal combustion engine comprising a carburetor, a manifold, and a cylinder head having a combustion chamber wherein the combustion engine has a main suction path in fluid communication from the carburetor through the manifold to the combustion chamber; and wherein said engine has a sub-suction path which is separate from the main suction path and is in fluid communication from the carburetor, through the intake manifold to the combustion chamber; and wherein a swirling motion is imparted to a fuel-air mixture in the combustion chamber when a first portion of the fuel-air mixture flows into the combustion chamber from the main suction path and a second portion of the fuel-air mixture issues from the sub-suction path into the combustion chamber at approximately a right angle to the first portion of the fuel-air mixture; and wherein the carburetor, the manifold, and the cylinder head have sub-suction path sections respectively such that these sections are placed in fluid communication with each other from the carburetor to the combustion chamber when the suction manifold is connected to the carburetor and to the cylinder head.

6. A suction system for an internal combustion engine, comprising:

A. a main path comprising a suction port formed in a cylinder head and adapted to be opened and closed by a suction valve, and a suction manifold connecting said suction port and a carburetor, and B. a sub-suction path provided separately from said main suction path, said sub-suction path comprising:

1. a first path portion formed in said cylinder head, a first end of said first path portion being opened into said suction port and a second end of said first path portion being opened in a cylinder head end face, said cylinder head end face being adjacent said suction manifold; and 2. a second path portion formed in said suction manifold, a first end of the second path portion opening into the cylinder head end face and a second end of the second path portion being opened in a suction manifold end face, said suction manifold end face being adjacent said carburetor; and 3. a third path portion formed in said carburetor, a first end of the third path portion being opened in the suction manifold end face and a second end of the third path portion opening into a flow path of the carburetor; said second end of the third path portion being branched to form two inlet ends of the sub-suction path, a first inlet end being always opened into said flow path between a venturi position and a throttle valve of said carburetor and a second inlet end opening into said flow path at a position such that said second inlet end is closed by said throttle valve under an idling operation;

C. a sub-suction path inlet end comprising the second end of the third path portion, said sub-suction path inlet end opening in the flow path of said carburetor so as to inject a gas into a combustion chamber during a suction stroke, thereby generating a swirl of gas in the combustion chamber;

D. a sub-suction path outlet end comprising the first end of the first path portion, said sub-suction path outlet end opening immediately upstream of the suction valve;

wherein, the sub-suction path is constructed solely by connecting the carburetor to the cylinder head through the suction manifold;

wherein, said carburetor is a two-barrel carburetor and said third path portion opens into a primary flow path of said two-barrel carburetor; and wherein, the sub-suction path is contained completely within the carburetor, the suction manifold and the cylinder head;

wherein a cross sectional area of the subsuction path is smaller than a cross sectional area of the main suction path;

whereby, connection of the carburetor to the suction manifold and connection of the suction manifold to the cylinder head causes the first path portion, the second path portion and the third path portion of the sub-suction path to be in fluid communication;

wherein, the first path portion is a cylindrical hole containing a pipe having an outside diameter which is substantially equal to an inside diameter of the cylindrical hole; a downstream portion of said pipe being necked down to form a nozzle having an outside diameter less than the inside diameter of the cylindrical hole; the downstream portion of the pipe being downwardly curved toward an upstream side of the suction valve such that when the suction valve is opened, an open end of the downstream portion of said pipe points into a zone just downstream of the suction valve;

whereby opening of the suction valve when there is subatmospheric pressure downstream of the suction valve causes a first portion of a fuel-air mixture to flow downstream through the main suction path and past the suction valve and causes a second portion of the fuel-air mixture to pass through the sub-suction path and to issue from the nozzle approximately at a right angle to the first portion of the fuel-air mixture, thus imparting a swirling motion to the fuel-air mixture in the zone just downstream of the suction valve.

7. A suction system for an internal combustion engine, comprising:

a main suction path constructed of a suction port formed in a cylinder head and adapted to be opened and closed by a suction valve, and a suction manifold connecting said suction port and a carburetor; and a sub-suction path provided separately from said main suction path and having its outlet end opened immediately upstream of said suction valve and its inlet end opened in a flow path of said carburetor so as to inject a gas into a combustion chamber during the suction stroke approximately at a right angle to gas flowing into said combustion chamber from said main suction path thereby to generate a swirl of the suction gas in said combustion chamber, wherein the improvement resides in that said sub-suction path is constructed of: a first path portion formed in said cylinder head, both ends of the first path portion being opened into said suction port and in the joint end face of said suction manifold, respectively; a second path portion formed in said suction manifold, both ends of the second path portion being opened in the joint end face of said cylinder head and in the joint end face of said carburetor, respectively; and a third path portion formed in said carburetor, both ends of the third path portion being opened in the joint end face of said suction manifold and into the flow path of said carburetor, respectively, so that the communication between said first, second and third path portions is established by combining said cylinder head, said suction manifold and said careburetor.

8. A suction system according to claim 7, wherein an injection nozzle pipe is fitted in said first path portion.

9. A suction system according to claim 7 or 8, wherein the open end portion of said third path portion at the side of said flow path is branched to form two inlet ends, the one of which is always opened into said flow path between a venturi portion and a throttle valve of said carburetor whereas the other of which is opened at such a position that is closed by said throttle valve under the idling operation.

* * * * *